US009064213B2

(12) United States Patent
Deng et al.

(10) Patent No.: US 9,064,213 B2
(45) Date of Patent: Jun. 23, 2015

(54) DYNAMIC MODEL-BASED ANALYSIS OF DATA CENTERS

(71) Applicant: International Business Machines Corporation, Armonk, NY (US)

(72) Inventors: Yu Deng, Yorktown Heights, NY (US); Rafah A. Hosn, New York, NY (US); Ruchi Mahindru, Elmsford, NY (US); Harigovind V. Ramasamy, Ossining, NY (US); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/759,503

(22) Filed: Feb. 5, 2013

(65) Prior Publication Data

US 2014/0222745 A1 Aug. 7, 2014

(51) Int. Cl.
*G06F 17/00* (2006.01)
*G06N 5/02* (2006.01)
*G06N 5/04* (2006.01)
*G06N 7/00* (2006.01)
*G06Q 10/00* (2012.01)

(52) U.S. Cl.
CPC ............ *G06N 5/025* (2013.01); *G06N 5/04* (2013.01); *G06N 7/005* (2013.01); *G06Q 10/00* (2013.01)

(58) Field of Classification Search
None
See application file for complete search history.

(56) References Cited

U.S. PATENT DOCUMENTS

| 5,999,978 | A  | * | 12/1999 | Angal et al. ............... 709/229 |
|---|---|---|---|---|
| 7,096,459 | B2 |   | 8/2006 | Keller et al. |
| 7,480,640 | B1 | * | 1/2009 | Elad et al. ................ 706/14 |
| 7,499,897 | B2 | * | 3/2009 | Pinto et al. ............... 706/46 |
| 2006/0212569 | A1 |   | 9/2006 | Ammerman, III et al. |
| 2010/0077078 | A1 |   | 3/2010 | Suit et al. |
| 2010/0254312 | A1 | * | 10/2010 | Kennedy .................. 370/328 |
| 2011/0029673 | A1 | * | 2/2011 | Jaisinghani ............... 709/226 |
| 2011/0173146 | A1 | * | 7/2011 | Hnatio ..................... 706/14 |
| 2013/0159240 | A1 | * | 6/2013 | Singh et al. ............... 706/51 |

OTHER PUBLICATIONS

"Reducing the Complexity of Application Deployment in Large Data Centers" Tamar Eilam, Michael H. Kalantar, Alexander V. Konstantinou, Giovanni Pacifici IBM T.J. Watson Research Center P.O. Box 704, Yorktown Heights, NY 10598, USA 2005.*

(Continued)

*Primary Examiner* — Kakali Chaki
*Assistant Examiner* — Luis Sitiriche
(74) *Attorney, Agent, or Firm* — Ryan, Mason & Lewis, LLP (57) ABSTRACT

Techniques for model-based analysis of a data center. A method includes creating a metamodel based on domain knowledge to represent a type of object and/or relationship of a data center, using static and dynamic configuration and data analysis techniques to discover topology of elements of the data center and represent the topology as a model that is an instance of the metamodel, using the model to perform analysis of the data center in connection with a specified task, leveraging domain knowledge represented in nodes of the metamodel to guide the analysis in terms of determining guidelines to apply to each node and determining relationships to traverse to continue the analysis, extending the domain knowledge by updating the metamodel upon discovery of additional knowledge for use in improving analysis tasks, and extending the model on-demand using dynamic analysis techniques upon detection of multiple analysis failures.

19 Claims, 7 Drawing Sheets

(56) References Cited

OTHER PUBLICATIONS

Etzioni et al., Web-Scale Information Extraction in KnowItAll. WWW2004, May 17-22, 2004, New York, New York, USA.
NELL: Never-Ending Language Learning. http://rtw.ml.cmu.edu/rtw/ Sep. 2012.
Fan et al. PRISMATIC: Inducing Knowledge from a Large Scale Lexicalized Relation Resource. Proceedings of the NAACL HLT 2010 First International Workshop on Formalisms and Methodology for Learning by Reading, pp. 122-127, Los Angeles, California, Jun. 2010.
Ghahramani, Learning Dynamic Bayesian Networks, in Lecture Notes in Computer Science, Springer, Adaptive Processing of Sequences and Data Structures, vol. 1387/1998.
Costa et al., A First-Order Bayesian Tool for Probabilistic Ontologies, in Proceedings of the 21st Florida FLAIRS UNBBayes-MEBN, May 2008, Coconut Grove, FL, USA.
Rish et al., Real-Time Problem Determination in Distributed Systems Using Active Probing, in Proceedings of NOMS 2004.

* cited by examiner

FIG. 7

DYNAMIC MODEL-BASED ANALYSIS OF DATA CENTERS

STATEMENT OF GOVERNMENT RIGHTS

This invention was made with Government support under Contract No.: H98230-11-C-0276, awarded by the Department of Defense. The Government has certain rights in this invention.

FIELD OF THE INVENTION

Embodiments of the invention generally relate to information technology (IT), and, more particularly, to data center analysis.

BACKGROUND

Automated analysis of systems in a large data center, for example, root cause analysis of performance problems in complex applications based on monitored metrics, is a challenging problem. Typically, such analysis, if automated, is carried out using ad hoc techniques and custom approaches, which can pose challenges when the system evolves in size and complexity from the perspective of keeping the logic up-to-date. Accordingly, a need exists for a framework where such analysis is knowledge-based, the framework provides a variety of methods to facilitate the continuous update of knowledge that forms the core of the system, and the analysis and automation modules are based primarily on the principle of interpreting declarative representations of knowledge rather than the execution of standard programming logic to capture IT automation domain knowledge.

In such a system, domain knowledge in the form of a metamodel would be advantageously discovered and updated continuously in a semi-automated manner by tools under the guidance of knowledge engineers. Further, the state of the data center (the topology of infrastructure as well as application elements) can be discovered, monitored, and updated continuously and represented as a model that is an instantiation of the metamodel. Model-based analysis can advantageously leverage the dynamically created data center model, as well as the knowledge embedded in the metamodel, to determine the root cause of problems and facilitate corrective actions to be performed automatically (also leveraging the metamodel) to enable autonomic management of the data center.

SUMMARY

In one aspect of the present invention, techniques for dynamic model-based analysis of data centers are provided. An exemplary computer-implemented method for model-based analysis of a data center can include the steps of creating a metamodel based on domain knowledge to represent at least one type of object and/or relationship of a data center, using static and dynamic configuration and data analysis techniques to discover topology of one or more elements of the data center and represent the topology as a model that is an instance of the metamodel, using the model to perform analysis of the data center in connection with a specified task, leveraging domain knowledge represented in one or more nodes of the metamodel to guide the analysis in terms of determining one or more guidelines to apply to each node and determining one or more relationships to traverse to continue the analysis, extending the domain knowledge to update the metamodel upon discovery of additional knowledge for use in improving one or more analysis tasks, and extending the model on-demand using one or more dynamic analysis techniques upon detection of multiple analysis failures.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes dynamic model-based analysis of data centers. At least one embodiment of the invention includes a framework for building systems that perform analysis of data center systems for specific types of problems (for example, detection and root cause analysis of performance problems, or detection and analysis of security attacks) and remediation of identified problems, and which use domain models to perform such analysis.

As detailed herein, at least one embodiment of the invention is based on (structured) domain knowledge or a metamodel, represented using, for example, a web ontology language such as OWL, embellished with rules, numbers representing probabilities used to construct probabilistic graphical models, and other forms of knowledge representation which are associated with specific entities and relationships in the domain. An aspect of the invention includes reasoning about a complex system (for instance, a software application) based on its topology, or a model that is an instance of the metamodel. Additionally, at least one embodiment of the invention includes reasoning about data (collected from the operational system) that represent attributes of the system that can aid in the analysis. For example, for an application, data (metrics) can be collected pertaining to the usage of all resources upon which the application depends.

Statistical techniques can be applied to a history of collected metrics, guided by the topology/model of the system being analyzed to determine metrics of which data center elements the analysis should be focused on. Further, in at least one embodiment of the invention, the framework facilitates the system model/topology to be partially statically learned through configuration analysis, and also dynamically learned on demand, based on the progress and history of the core system analysis being performed within the framework. The framework also facilitates the incorporation of probabilistic graphical models to be used for system analysis, as well as the representation of such probabilistic models anchored by the domain metamodel, and the dynamic generation of the probabilistic graphical model used for the analysis of a system based on the metamodel and the discovered system models.

At least one embodiment of the invention also includes facilitating the dynamic learning of new domain knowledge to extend the metamodel, including fully automated metamodel extensions for some (simple) cases, and expert-guided extensions to the metamodel, both approaches anchored around the basic metamodel and a model-based analysis approach.

As detailed herein, an aspect of the invention includes the use of domain metamodels. Such metamodels can include, for example, rules associated with memory metrics that can affect performance such as page file size, paging rate, etc. Such metamodels can also include probabilities such as those assigned to probabilistic graphical models derived from topology for performance root cause analysis (RCA), or knowledge of a published vulnerability of a given IT component and a response to a security attack exploiting that vulnerability.

Additionally, an aspect of the invention includes the use of topology (model) discovery techniques. Further, at least one embodiment of the invention includes linking a data center topology to an IT metamodel to leverage knowledge in the metamodel, as well as executing dynamic discovery techniques on demand. As also described herein, an aspect of the invention includes providing techniques usable during static/dynamic topology discovery to dynamically learn new metamodel nodes.

Static topology discovery via configuration and even code analysis (such as depicted, for example, via element 206 in FIG. 2) is known to those skilled in the art. Demand-based dynamic topology discovery starts with a statically discovered topology—both of the underlying infrastructure hosting middleware and applications, and also of complex N-tier applications running on the infrastructure. Once model-based analysis is applied to application topologies (models) to identify root causes of performance problems (say) encountered during steady state operations, and no root cause is detected repeatedly, then in one embodiment of this invention, demand-based dynamic topology discovery (such as depicted, for example, via element 306 in FIG. 3) is initiated. This approach is more efficient than constantly performing such analysis to detect new topologies (models), because such processes are expensive to execute.

Figure 4:
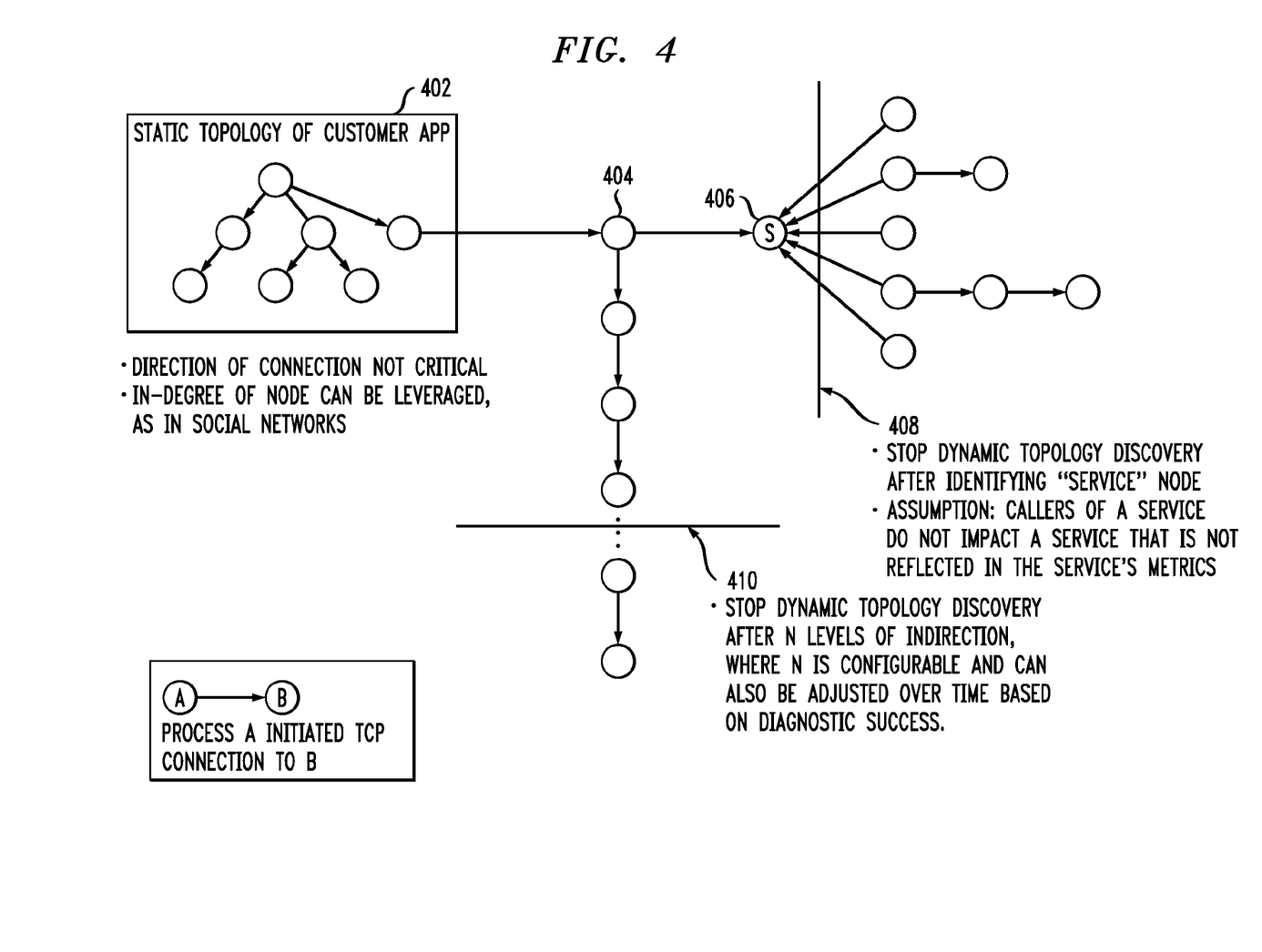
FIG. 4 is a diagram illustrating how network-based dynamic topology discovery can be performed, triggered by repeated failures in model-based analysis, according to an embodiment of the invention.

Dynamic topology discovery is guided by the currently known topology, which may include statically discovered topology and also dynamically discovered topology in a prior iteration of this process. The discovery process employs the currently known topology to guide the discovery of new nodes, to extend the model that represents new IT elements in a subset of the data center that is supporting the subject of model-based analysis (for example, an application whose performance is being analyzed, or a security attack on a set of systems that is being responded to). Discovery is a 3-step process (as depicted in FIG. 4) that is repeated until deterministic or heuristic stopping conditions are detected, as described below.

In step 1, for each known topology node representing a software component, the operating system (OS) running on the server where the software component is running is identified. If mappable to a process, at least one embodiment of the invention includes determining whether the process is participating in network connections (for example, has an open transmission control protocol (TCP) socket in LISTENING or CONNECTED mode).

In step 2, a 'tcpdump'-like utility as well as operating system-level facilities is used for each such process to analyze network flows it is participating in, and the partner end point (interne protocol (IP) address, port-number) of each TCP connection for which this process is an end point is discovered. The use of "netflow" tracing in switches to enable this type of analysis is also an option in one or more embodiments of the invention. Note that in the latter case, "netflow" tracing may be set in switches on a permanent basis and such trace data stored in a warehouse, where it may be accessed later as required for dynamic topology discovery. With "netflow" data from the past, the "direction" of a TCP connection—that is, which node initiated the connection and which node was the "listener"—can be determined, which can be important for identifying services in the data center. For each such TCP connection, if the partner is not a known topology node, it is determined to be a new node reflecting a new dependency and it is added to the topology/model.

In step 3, operating system-level facilities are used to identify the process that is hosting each TCP connection partner end point (especially the TCP port number) identified in step 2. If the process' TCP end point is a well-known port, it can be associated with a known metamodel node (for example, a Web server listens on port 80, IBM's DB2 database server listens on port 50000, etc.). If the TCP end point is not a well-known port, then, potentially, a new metamodel node may have been identified if analysis of network flows to/from that node is used to determine if that node is a new type of service. Metamodel discovery as a side effect of dynamic topology discovery is described further below.

Steps 1 through 3 above are repeated as long as new topology nodes are discovered, though, an iteration may be terminated after a preconfigured threshold of N iterations have been performed. Additionally, at least one embodiment of the invention may stop dynamic topology discovery if a new node is found to be a service.

An aspect of the invention also includes topology- and state-(health status) driven metrics collection and diagnosis, which can include statistical analysis of metrics history for each node in a topology that can be a potential root cause of the problem.

Further, as described herein, at least one embodiment of the invention includes the use of probabilistic reasoning. Bayesian Networks (BNs) dynamically generated for a subset of the topology (for example, an application with a performance problem and the resources it directly depends on) can be leveraged for RCA. Learning of BN probabilities is well-known, can be continuous, and can be based on the frequency of the type of root cause resource identified (for example, a given type of disk drive) if the diagnostics are determined to be correct. Such continuously evolving BN parameters (probabilities) can be associated with a link between two resource types (for example, a file system and a disk drive) and thus be part of the domain knowledge stored in the metamodel. Additionally, learning of new metamodel and model/topology nodes and relationships can be automatically reflected in BNs generated in the future from the new topology, thereby enhancing the accuracy of the analysis.

At least one embodiment of the invention additionally includes metamodel learning. Recently refined artificial intelligence—(AI-)based methods to extract structured knowledge from unstructured text analysis of Web content (for example, mailing lists for discussion Linux performance problems and remedies, Microsoft Windows issues discussed in Microsoft Developer Network sites, etc.) can be employed in such knowledge-based systems. Metamodel learning can also be bootstrapped by incorporation of structured knowledge such as common information models (CIMs) that are constantly updated by expert groups. For example, the CIM block storage device modeling subgroup would have added metamodel nodes representing solid state drives when they were first introduced. Ingesting such a new CIM model can automatically enrich the IT domain metamodel, representing knowledge such as the fact that a solid state disk drive is a new type of disk drive, thus inheriting causality relationships already defined in the metamodel such as "disk drive performance may impact file system performance." Accordingly, an aspect of the invention includes incorporation of CIM-based models, primarily used for systems management in the industry, into richer metamodels (for example, OWL ontologies) used for model-based analysis using domain knowledge. Additionally, other techniques for metamodel node discovery can be utilized in one or more embodiments of the invention.

In one embodiment of the invention, metamodel nodes may be discovered as a side effect of (existing) topology-guided dynamic topology discovery described above. In Step 3 of the topology discovery process detailed above, if the partner process of the known topology node's process participating in a TCP connection is using a non-well known TCP port, if it is discovered that the number of TCP connections initiated to this node by other TCP end points identified in network flows greatly exceeds the number of TCP connections the node itself has initiated, then the new node is identified as a candidate service that plays an important role in the data center. As noted herein, using switch-level "netflow" data, how many end points initiate TCP connections to this newly discovered topology node compared to end points to which the node itself initiates connection to, can be determined. If the difference is sufficiently large, then in spite of the node listening on a non-well known port, the system can hypothesize that the new node represents an instance of a new type of service for which a new metamodel node should be created. The system can alert the knowledge engineer, who can initiate further discovery steps to confirm or reject the hypothesis proposed. In knowledge engineering terms, extrinsic domain knowledge about a new node discovered in the data center, coupled with analysis of the number of incoming versus outgoing TCP connections for which that node is an end point, is used to infer intrinsic domain knowledge about a new type of entity in the data center that is represented as a new node in the domain metamodel. The threshold value of the difference in the number of incoming versus outgoing connection requests to a node, to heuristically identify a dynamically discovered node as a new metamodel node candidate, can be determined based on experience or experimentation.

In another embodiment of the invention, new metamodel nodes may be discovered as a side effect of static topology discovery that employs configuration analysis (for example, from known techniques), where the metamodel discovery part is an extension. By way of example, a static discovery tool such as IBM's Tivoli® TADDM product may record in the Change and Configuration Management Database (CC-MDB) a new descriptor of a disk drive by reading what is recorded in the operating system's device discovery configuration file, that the operating system (OS) itself extracts from the disk drive during boot. That configuration information might describe the new disk drive as a "2 TB SAS drive"—for which no metamodel node currently exists because the knowledge engineers may be oblivious to the fact that such disk drives have been introduced in the data center and need to be modeled in the knowledge. In one embodiment of the invention, the system alerts the knowledge engineers about that requirement.

In a method for analyzing the output of discovery tools to build the data center topology/model and associate it with known metamodel nodes, mapping tables (such as depicted via element 508 in FIG. 5) are employed to enable parsing of configuration database fields populated by discovery tools to identify which configuration (database) items correspond to which types of model nodes (for example, disk drives, CPUs, virtual servers, Web application servers, etc.). When a new configuration item described as "2 TB SAS drive" is encountered in the configuration database, no mapping table entry matches. Based on the location of the configuration item's entry in the configuration database, namely where information about other types of disk drives are stored, the metamodel discovery extensions of the static topology discovery module of at least one embodiment of the invention can hypothesize that the configuration item "2 TB SAS drive" represents a new type of disk drive, and the knowledge engineer, who can confirm or reject the system-generated hypothesis, is alerted.

Figure 1:
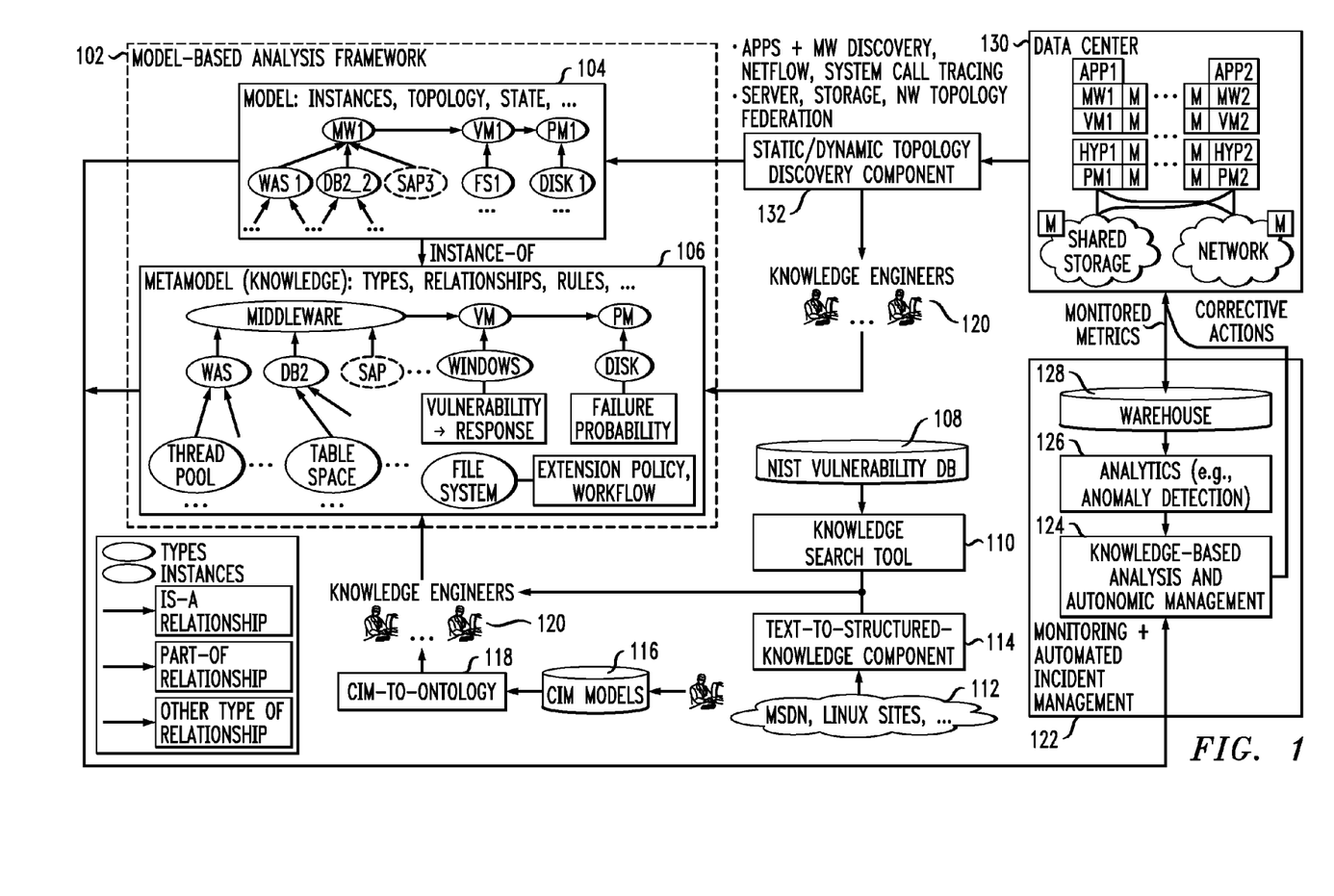
FIG. 1 is a block diagram illustrating an overall model-based analysis framework, according to an embodiment of the present invention.

FIG. 1 is a block diagram illustrating overall model-based analysis framework 102, according to an embodiment of the present invention. The framework 102 includes a metamodel 106 representing knowledge of data center (infrastructure and application) elements and relationships between them, diagnostic and auto-corrective rules associated with different metamodel elements, metadata associated with relationships to enable probabilistic reasoning on groups of elements (for example, using Bayesian networks), etc. The framework 102 additionally includes a model 104 that includes information covering data center topology, state, etc. Model 104 is an instance of the metamodel 106, and represents the current state of the data center. Static and dynamic topology discovery techniques described above are used to build model 104 from data center 130, and associate it with metamodel 106. Also, as depicted in FIG. 1, data center 130 interacts with a warehouse 128 within a monitoring and automated incident management component 124, which also includes an analytics module 126 and a knowledge-based analysis and automatic management module 124.

Further, metamodel 106 is continuously updated by knowledge engineers 120, who are continuously provided with metamodel update candidates by tools described herein, such as CIM-to-ontology transformers 118 which are run when new CIM models 116 are available for IT domains, text-to-structured-knowledge transformation components 114 (based on AI techniques), which are run on unstructured text-oriented knowledge sources 112, and knowledge search tools 110 specially tailored to extract structured and semi-structured knowledge sources 108, which are run periodically. Also, as described herein, new candidate metamodel nodes can also be identified as side effects of the static and dynamic topology discovery processes as described above, leveraging a static/dynamic topology discovery component 132 in FIG. 1.

Figure 2:
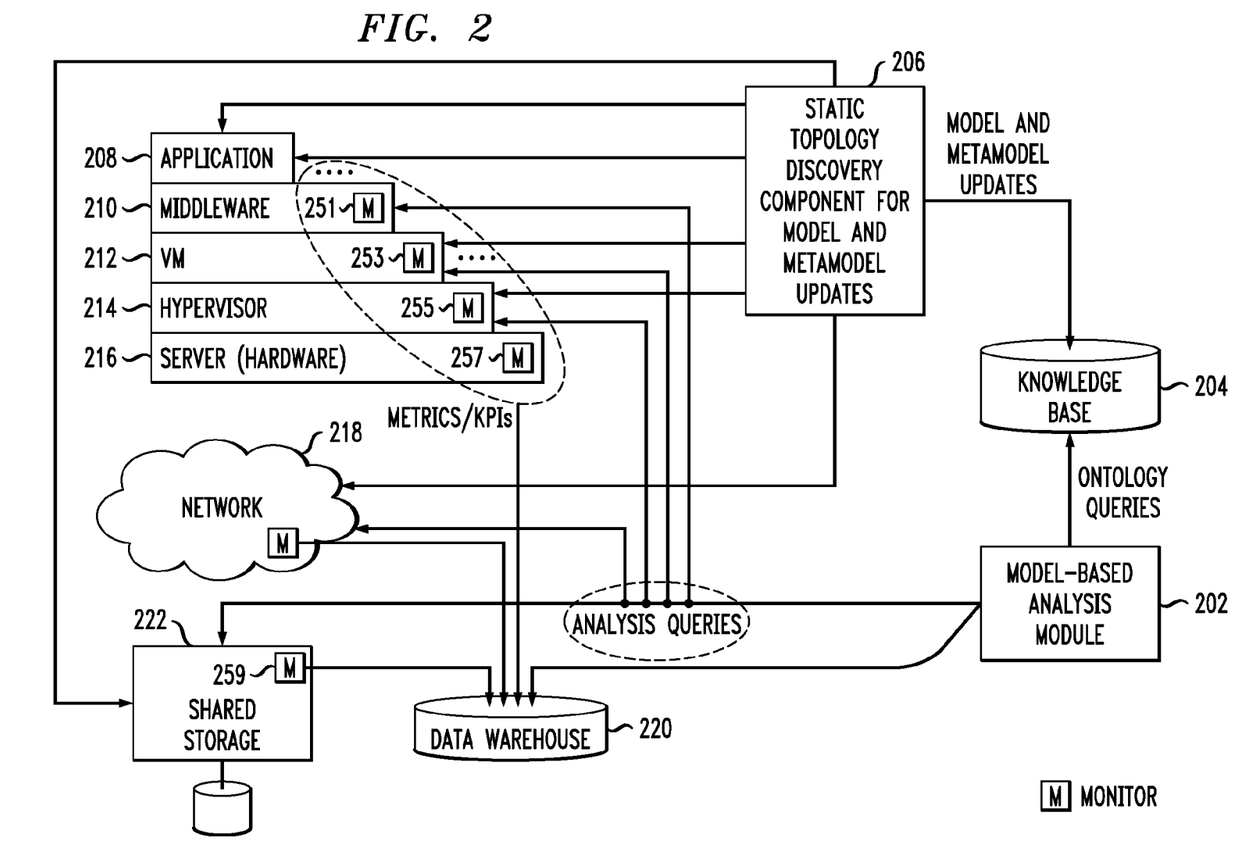
FIG. 2 is a diagram illustrating the use of the model-based analysis framework for root cause determination of application performance problems, according to an embodiment of the present invention.

FIG. 2 is a diagram illustrating the use of the model-based analysis framework for root cause determination of application performance problems, according to an embodiment of the present invention. By way of illustration, FIG. 2 depicts an analysis module 202, a knowledge base 204 (which contains metamodel and model/topology information), and a static topology discovery component 206 that is used for model and metal model updates. FIG. 2 also depicts key (IT) components of a data center that constitute its topology. A server 216, a network 218, and a shared storage component 222 that form the core infrastructure components of the data center are also depicted.

Additionally depicted in FIG. 2 is a hypervisor 214 running on server 216 that enables virtualization in cloud-like deployments of customer workloads, a virtual server/machine (VM) 212 provisioned and managed by the hypervisor 214, a middleware component 210, and an application 208 running on the virtual server and leveraging middleware services. Collection of metrics at all layers—application, middleware, VM, hypervisor, infrastructure components, etc., is critical since it provides the basic data for model-based analysis. Data warehouse 220 is used to store historical metrics data, which is used to perform model-based analysis such as performance RCA when required.

As detailed herein, domain knowledge (such as contained in knowledge base 204) is represented using metamodel nodes representing key data center components—physical and virtual servers, storage, networks, middleware, applications, relationships between metamodel nodes, and also additional knowledge associated with both metamodel nodes and relationships which can be used for model-based analysis. Further, knowledge base 204 also includes the data center model (topology) that is associated with the metamodel as an instance of it representing data center state.

In FIG. 2, the static topology discovery component 206 uses topology discovery techniques to analyze the configurations of server 216, hypervisor 214, virtual machine (VM) 212, middleware 210 and application 208, as well as other similar data center components of interest, and creates a model to add to knowledge base 204, as instances of the predefined metamodel in knowledge base 204. This is step is performed once, but can be repeated when any configuration change occurs—for example, when a new VM is created on the hypervisor and new software is deployed thereon. During the steady state operation of the applications and infrastructure support elements in the data center, monitors 251, 253, 255, 257 and 259, labeled 'M' in each topology node of interest collect operational data related to that component—for example, CPU and memory utilization metrics of VM 212—and store the information in data warehouse 220. Subsequently, if a performance, security, or other problem is reported, the analysis module 202 reads metamodel and model information from knowledge base 204 and historical performance data from data warehouse 220 to perform model-based analysis.

Consider, for example, a performance problem analysis process. Applications of interest are monitored for response time or throughput. The definition of a service level agreement (SLA) from a customer, for an application running on the data center, might state the following: the average response time of the application for a user request over N consecutive requests must be less than or equal to Y seconds. An SLA violation, determined by continuous analysis of application response time metrics collected in the data warehouse, triggers a problem determination (PD) process.

As described herein, the sequence of diagnostic steps can be determined by a traversal of the application topology/model, which includes (its dependency relationships with) all data center resources used by the application either directly or transitively, and which can therefore have some impact on its performance. Also, the order in which the application's dependent resources are investigated for some type of abnormality is based on knowledge of most probable root causes. Such knowledge can be hard-coded in the traversal logic, or can be represented as probabilities in a Bayesian network generated from a subset of the application topology, and thus the most probable root cause can be determined by a standard BN execution process.

For the current resource under investigation during the topology walk, at least one embodiment of the invention includes searching for and/or identifying an anomaly in that resource's behavior by analysis of metric(s). An anomaly can either identify the root cause of the performance problem, or indicate that further drill-down is necessary by traversing another node in the model/topology.

Algorithms applied to metrics history to identify resource usage abnormalities and potential root causes can include a correlation of application response time with resource metrics over the last X minutes, wherein a high correlation indicates an anomaly. Additionally, a time series analysis can include training for Y hours followed by forecasting/prediction over X minutes, wherein a deviation from predicted values indicates an anomaly.

Figure 3:
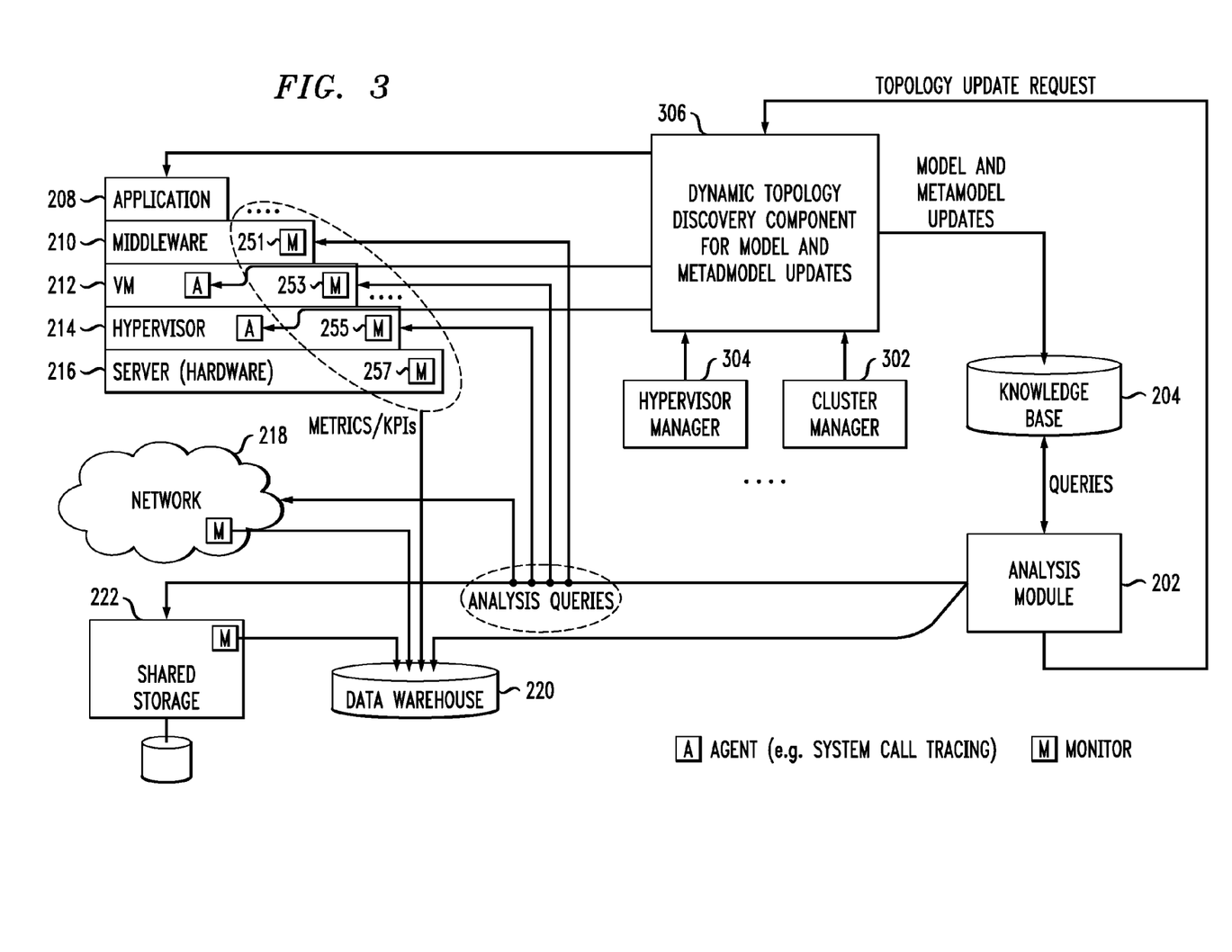
FIG. 3 is a diagram illustrating an example framework for dynamic updating of data center topology, according to an embodiment of the present invention.

FIG. 3 is a diagram illustrating an example framework for dynamic updating of data center topology, according to an embodiment of the present invention. By way of illustration, FIG. 3 contains the components of FIG. 2, but replaces the analysis component for static topology discovery component 206 with a component that can also discover new topologies (models) that static discovery does not cover. The dynamic topology discovery component 306 leverages a hypervisor manager, 304, to inform it when new VM provisioning, VM deprovisioning and VM migration (from one hypervisor to another) occur, so that topology (model) changes can be detected and knowledge base 204 updated. Similarly, component 306 leverages cluster manager 302 to be informed about automated load-balancing related changes it might initiate, for example, to instantiate a new cluster member (such as a Web application server) to handle a spike in the request rate, or to destroy such an instance when the request rate subsides over time, each of which results in a topology/model change that must be reflected in knowledge base 204 to enable accurate model-based analysis.

In accordance with at least one embodiment of the invention, application (configuration) analysis creates an initial topology, and an ontology (metamodel instance) is created in knowledge base (KB) 204 for this application. The application (ontology) is registered to the dynamic topology discovery (DTD) component 306 to track dynamic updates, and the DTD component 306, in turn, registers to other "manager" modules in the data center (such as depicted on the hypervisor manager module 304 and cluster manager module 302 in FIG. 3), to be informed about events that may indicate application topology changes. Note also that if such manager components do not have notification mechanisms, the dynamic topology discovery component 306 can resort to polling.

Dynamic topology discovery techniques can also include, for example, system call tracing and network flow analysis. That aspect of dynamic topology discovery, also performed by component 306, in at least one embodiment of the invention, is metamodel-driven. Such an embodiment of the invention can also include guided topology discovery. For instance, if analysis module 202 cannot determine the root cause of an application problem using current topology, one possibility is that the topology is incomplete. As such, the DTD component 306 can seek to collect more topology information. The DTD component 306 can accomplish this, for example, by initiating system call tracing in an OS to determine file system usage. If a shared file system (FS) (or storage) is used, the DTD component 306 can examine those resources in the future during performance PD. The demand-based additional-topology approach of this embodiment avoids potentially complex detailed topology discovery of an entire data center, which can be prohibitive in terms of computational expense. Additionally, for example, a security breach detection causes (optimal) reprovisioning of application components, resulting in topology changes which can be discovered using static and dynamic topology discovery techniques.

As also detailed herein, at least one embodiment of the invention includes performing network analysis to learn new topologies that were not discovered earlier using static techniques. The details of network analysis-based dynamic topology discovery have been described herein above as a three-step process.

FIG. 4 is a diagram illustrating how network-based dynamic topology discovery can be performed, triggered by repeated failures in model-based analysis, according to an embodiment of the invention. FIG. 4 corresponds to the description of the 3-step discovery process described earlier. Specifically, FIG. 4 illustrates the results of the 3-step network-based dynamic discover process, and not components with data flows between them. Dynamic topology discovery starts with the known topology 402. As steps 1 through 3 are iteratively applied, new topology nodes 404, 406, 408 and 410 are discovered as described by the algorithm. Node 406 is discovered to be a (known or unknown) service, because a majority of connections to that process are found to have been initiated by other processes—as indicated by the direction of the TCP connection setup found in switch netflow analysis records. Therefore, further iteration based on node 406 is not continued. However, network flow analysis of node 404 leads to the discovery that it uses another node, which uses another node, and so on, and as per the 3-step discovery process, the transitive discovery process is stopped after N-steps where N could be statically configured, but also adjusted over time if initial values are found to be overly conservative (too small) or liberal (too large) in terms of the usefulness of the new topology nodes found in subsequent model-based analysis.

Additionally, at least one embodiment of the invention includes accommodating dynamic metamodel updates. An extension to the model based analysis framework can be implemented that allows dynamic metamodel extensions to be integrated into the overall analytics system. Extensions to the metamodel can be automated (for example, learning about a new disk drive type from CIM models), including how to monitor it. Also, the learning of other concepts (metamodel nodes and relationships) can be guided by an expert while the framework eases a seamless integration.

An extension to topology discovery can be applied to look for opportunistic metamodel updates. As detailed herein above, meta-model learning can be bootstrapped by incorporation of structured knowledge such as CIMs that are constantly updated by expert groups.

Figure 5:
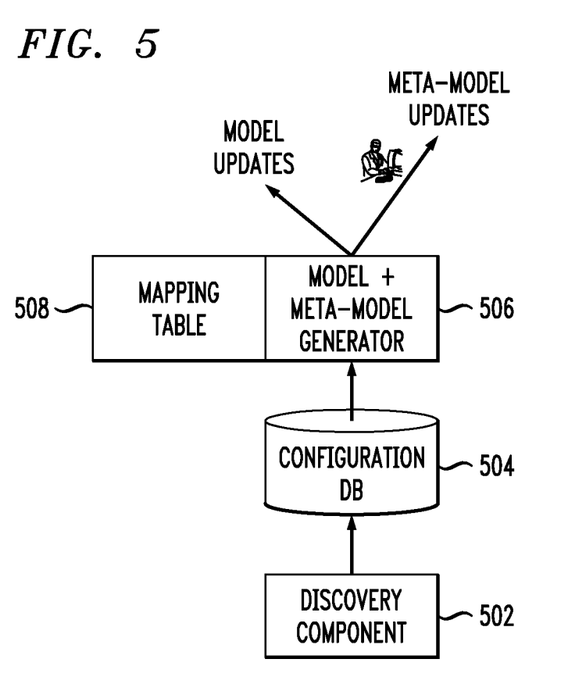
FIG. 5 is a block diagram illustrating how new metamodel nodes may be learnt dynamically during steady state operation of the system, according to an embodiment of the invention.

FIG. 5 is a block diagram illustrating how new metamodel nodes can be learnt as a side effect of the static topology discovery process performed by topology discovery component 206 in FIG. 2. By way of illustration, FIG. 5 depicts a discovery component 502, a configuration database (DB) 504, a mapping table component 508, and a model (and metamodel) generator component 506, which generates model and metamodel updates.

In FIG. 5, the discovery component 502 (such as IBM's Tivoli® Application Dependency Discovery Manager (TADDM)) can record, for example, "2 TB SAS drive" as a new type of device in the configuration DB 504. The model generator 506 uses knowledge of discovery component-created records in configuration DB 504 to create model objects. The mapping table 508 is used by the model generator to map configuration database items (entries) to model objects (and relationships) in knowledge base 204 in FIGS. 2 and 3. Upon encountering an unknown descriptor in a configuration DB 504 record for which no mapping table entry exists, heuristics (based, for example, on text analysis) can be used to hypothesize the presence of a new metamodel node. Further, in at least one embodiment of the invention, such a hypothesis can be vetted via a knowledge engineer.

Domain knowledge adds, for example, representation of causality relationships such as a disk drive's effect on file system performance, and thus on the performance of applications that use files in that file system. Domain knowledge also adds representation of heuristic (or crowd-sourced) knowledge, such as guidelines for random-access memory (RAM) versus pagefile.sys size and its impact on performance.

Figure 6:
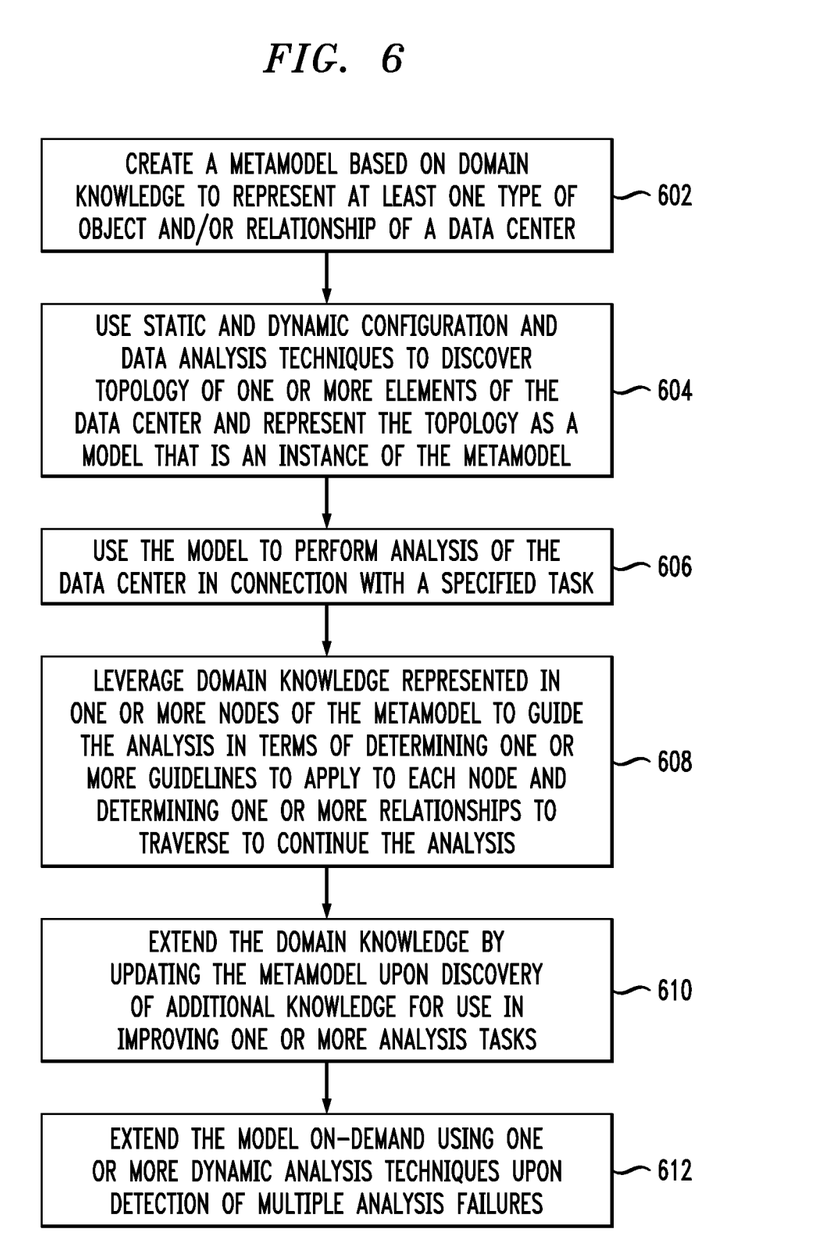
FIG. 6 is a flow diagram illustrating a technique for model-based analysis of a data center, according to an embodiment of the invention.

FIG. 6 is a flow diagram illustrating a technique for model-based analysis of a data center, according to an embodiment of the invention. Step 602 includes creating a metamodel based on domain knowledge to represent at least one type of object and/or relationship of a data center. Creating a metamodel can include creating a representation of types of data center entities comprising at least one of customer applications, middleware upon which customer applications run, and virtual and physical infrastructure elements and relationships between them.

Additionally, as detailed herein, creating a metamodel can include generating a Web ontology language (OWL) ontology of infrastructure, middleware and applications of the data center. Additionally, as described herein, a metamodel can include a representation of rules and guidelines that can be used to diagnose problems related to running customer workloads on the data center.

Domain knowledge can include model knowledge required for analysis focused on a specific object and/or a specific relationship in the data center. Domain knowledge can also include rules associated with memory metrics as well as knowledge of a vulnerability of a given component. Further, domain knowledge can include probabilities assigned to types of relationships between object types for use in creating a probabilistic graphical model from the instance of the metamodel for performance of root cause analysis, security analysis, and/or other analysis tasks. Further, domain knowledge can include, for example, knowledge required for analysis focused on a specific type of object and/or a specific relationship between multiple types of objects in the data center (for example, resource dependencies). Also, domain knowledge can include one or more rules representing guidelines for resource usage.

Step 604 includes using static and dynamic configuration and data analysis techniques to discover topology of one or more elements of the data center, and represent the topology as a model that is an instance of the metamodel. As detailed herein, leveraging the metamodel to build a dynamic model can include statically building a dynamic model, for example, using configuration analysis techniques. Also, leveraging the metamodel to build a dynamic model can include dynamically building a model using network flow analysis and/or call analysis. Further, in at least one embodiment of the invention, dynamically building a model includes using a demand-based technique on only a subset of the data center.

Step 606 includes using the model to perform analysis of the data center in connection with a specified task. Step 608 includes leveraging domain knowledge represented in one or more nodes of the metamodel to guide the analysis in terms of determining one or more guidelines to apply to each node and determining one or more relationships to traverse to continue the analysis.

Step 610 includes extending the domain knowledge by updating the metamodel upon discovery of additional knowledge for use in improving one or more analysis tasks. Extending the domain knowledge by updating the metamodel can include applying semi-automated expert-guided extensions to the metamodel. Additionally, at least one embodiment of the invention includes continuously extending the domain knowledge.

Step 612 includes extending the model on-demand using one or more dynamic analysis techniques upon detection of multiple analysis failures. Extending the model comprises using network flow analysis and heuristics to determine when to stop the method.

Also, at least one embodiment of the invention includes extending the metamodel during static topology discovery by analyzing one or more new entries in a configuration database for which no mapping table entries exist. Further, at least one embodiment of the invention includes extending the metamodel during dynamic topology discovery via network flow analysis by identifying new types of services corresponding to newly discovered topology nodes, based on counting connections initiated by versus connections initiated to such nodes by other network endpoints in the data center.

The techniques depicted in FIG. 6 can also include collecting model- and/or state-driven metrics as well as performing statistical analysis of metrics history for each resource in the model that can be a potential root cause of a problem such as application performance. Additionally, at least one embodiment of the invention includes automatically translating unstructured knowledge to structured knowledge.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system.

Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 7:
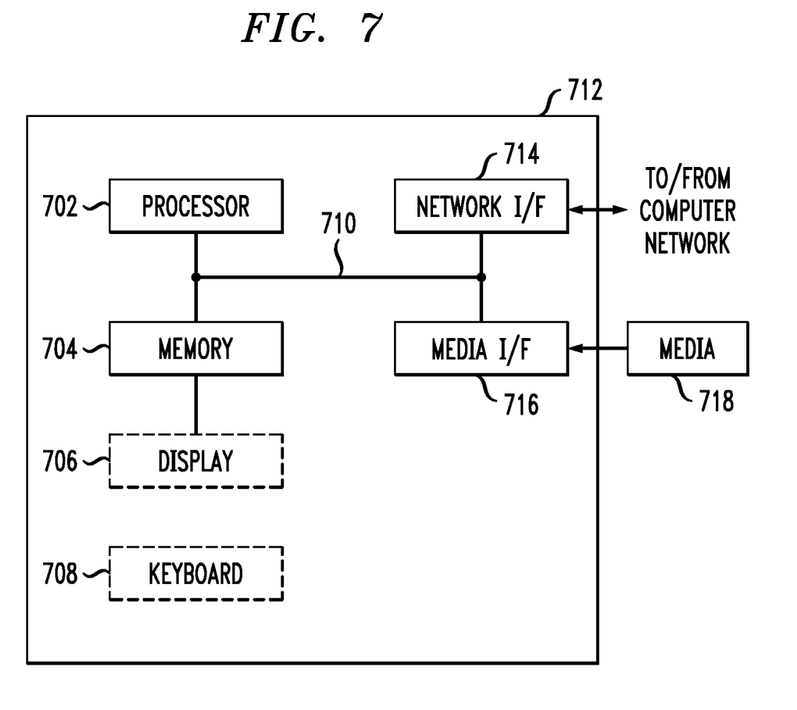
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, to functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using ontology (metamodel) to guide the generation and updates of a probabilistic model for each application on which performance problem determination (PD) is to be performed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for model-based analysis of a data center, the method comprising:
   creating a metamodel based on domain knowledge to represent at least one type of object and/or relationship of a data center;
   using static and dynamic configuration and data analysis techniques to discover topology of one or more elements of the data center and represent the topology as a model that is an instance of the metamodel;
   extending the metamodel during dynamic topology discovery via network flow analysis by identifying one or more new types of services corresponding to one or more newly discovered topology nodes, based on counting one or more connections initiated by versus one or more connections initiated to such nodes by one or more other network endpoints in the data center;
   using the model to perform analysis of the data center in connection with a specified task;
   leveraging domain knowledge represented in one or more nodes of the extended metamodel to guide the analysis in terms of determining one or more guidelines to apply to each node and determining one or more relationships to traverse to continue the analysis;
   extending the domain knowledge by updating the extended metamodel upon discovery of additional knowledge for use in improving one or more analysis tasks; and
   extending the model on-demand using one or more dynamic analysis techniques upon detection of multiple analysis failures;
   wherein at least one of the steps is carried out by a computer device.

2. The method of claim 1, wherein creating a metamodel comprises creating a representation of types of data center entities comprising at least one of customer applications, middleware upon which customer applications run, and virtual and physical infrastructure elements and relationships between them.

3. The method of claim 1, wherein the metamodel comprises a representation of supplemental knowledge for use in diagnosing one or more problems associated with customer workloads running on the data center.

4. The method of claim 1, wherein domain knowledge comprises knowledge required for analysis focused on a specific type of object and/or a specific relationship between multiple types of objects in the data center.

5. The method of claim 1, wherein domain knowledge comprises one or more rules representing guidelines for resource usage.

6. The method of claim 1, wherein domain knowledge comprises one or more probabilities assigned to types of relationships between object types for use in creating a probabilistic graphical model from the instance of the metamodel for performance of root cause analysis, security analysis, and/or other analysis tasks.

7. The method of claim 1, wherein extending the model comprises using network flow analysis and heuristics to determine when to stop the method.

8. The method of claim 1, wherein representing the topology as a model comprises using a dynamic technique on only a subset of the data center.

9. The method of claim 1, wherein extending the domain knowledge by updating the extended metamodel comprises continuously extending the domain knowledge.

10. The method of claim 1, wherein extending the domain knowledge by updating the extended metamodel comprises applying semi-automated expert-guided extensions to the metamodel.

11. The method of claim 1, comprising:
    extending the metamodel during static topology discovery by analyzing one or more new entries in a configuration database for which no mapping table entries exist for model creation and update.

12. An article of manufacture comprising a non-transitory computer readable storage medium having computer readable instructions tangibly embodied thereon which, when implemented, cause a computer to carry out a plurality of method steps comprising:

creating a metamodel based on domain knowledge to represent at least one type of object and/or relationship of a data center;
using static and dynamic configuration and data analysis techniques to discover topology of one or more elements of the data center and represent the topology as a model that is an instance of the metamodel;
extending the metamodel during dynamic topology discovery via network flow analysis by identifying one or more new types of services corresponding to one or more newly discovered topology nodes, based on counting one or more connections initiated by versus one or more connections initiated to such nodes by one or more other network endpoints in the data center;
using the model to perform analysis of the data center in connection with a specified task;
leveraging domain knowledge represented in one or more nodes of the extended metamodel to guide the analysis in terms of determining one or more guidelines to apply to each node and determining one or more relationships to traverse to continue the analysis;
extending the domain knowledge by updating the extended metamodel upon discovery of additional knowledge for use in improving one or more analysis tasks; and
extending the model on-demand using one or more dynamic analysis techniques upon detection of multiple analysis failures.

13. The article of manufacture of claim 12, wherein creating a metamodel comprises creating a representation of types of data center entities comprising at least one of customer applications, middleware upon which customer applications run, and virtual and physical infrastructure elements and relationships between them.

14. The article of manufacture of claim 12, wherein the metamodel comprises a representation of supplemental knowledge for use in diagnosing one or more problems associated with customer workloads running on the data center.

15. The article of manufacture of claim 12, wherein domain knowledge comprises one or more probabilities assigned to types of relationships between object types for use in creating a probabilistic graphical model from the instance of the metamodel for performance of root cause analysis, security analysis, and/or other analysis tasks.

16. The article of manufacture of claim 12, wherein extending the model comprises using network flow analysis and heuristics to determine when to stop the method.

17. The article of manufacture of claim 12, wherein extending the domain knowledge to update the extended metamodel comprises applying semi-automated expert-guided extensions to the metamodel.

18. The article of manufacture of claim 12, wherein the method steps comprise:
extending the metamodel during static topology discovery by analyzing one or more new entries in a configuration database for which no mapping table entries exist.

19. A system for model-based analysis of a data center, comprising:
at least one distinct software module, each distinct software module being embodied on a tangible computer-readable medium;
a memory; and
at least one processor coupled to the memory and operative for:
creating a metamodel based on domain knowledge to represent at least one type of object and/or relationship of a data center;
using static and dynamic configuration and data analysis techniques to discover topology of one or more elements of the data center and represent the topology as a model that is an instance of the metamodel;
extending the metamodel during dynamic topology discovery via network flow analysis by identifying one or more new types of services corresponding to one or more newly discovered topology nodes, based on counting one or more connections initiated by versus one or more connections initiated to such nodes by one or more other network endpoints in the data center;
using the model to perform analysis of the data center in connection with a specified task;
leveraging domain knowledge represented in one or more nodes of the extended metamodel to guide the analysis in terms of determining one or more guidelines to apply to each node and determining one or more relationships to traverse to continue the analysis;
extending the domain knowledge by updating the extended metamodel upon discovery of additional knowledge for use in improving one or more analysis tasks; and
extending the model on-demand using one or more dynamic analysis techniques upon detection of multiple analysis failures.

* * * * *